UNITED STATES PATENT OFFICE.

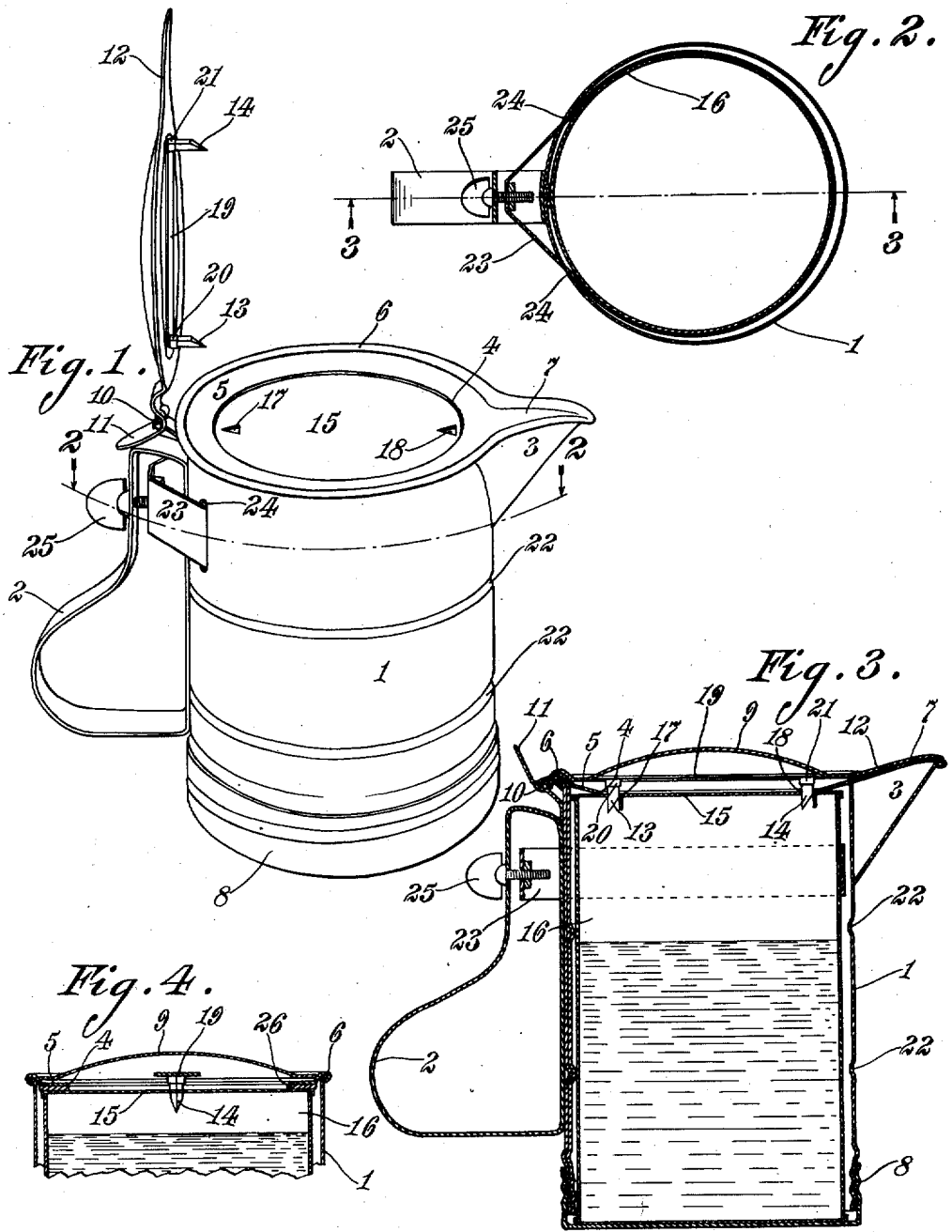

BERTHOLD A. LANGE, OF ST. LOUIS, MISSOURI.

COMBINED CAN CONTAINER AND PERFORATOR.

1,149,840.  Specification of Letters Patent.  Patented Aug. 10, 1915.

Application filed September 12, 1914. Serial No. 861,356.

*To all whom it may concern:*

Be it known that I, BERTHOLD A. LANGE, a citizen of the United States, residing at the city of St. Louis, State of Missouri, have invented certain new and useful Improvements in Combined Can Containers and Perforators, of which the following is a specification.

This invention relates to receptacles for holding cans of condensed milk or other cans the contents of which evaporate or deteriorate when exposed to air, and has for its object to provide an improved receptacle of this character whose cover carries perforating means which serve to puncture the can so as to make an outlet for permitting the contents of the can to be poured therethrough and an inlet for allowing air to enter the can during the pouring process, the perforating means serving, also, automatically to close the perforations when the cover of the receptacle is closed, and to open same when the cover is opened.

Another object of the present invention is to provide a sanitary receptacle which will prevent portions of the contents of a can contained in the receptacle from entering spaces between the can and the receptacle, and which has no channels or valves or other inaccessible part where portions of the contents of the can may collect, clog, and become stale.

In the accompanying drawings forming part of this specification, in which like numbers of reference denote like parts wherever they occur, Figure 1 is a perspective view of an improved receptacle embodying the present invention with a can therein; Fig. 2 is a sectional view on the line 2—2, Fig. 1; Fig. 3 is a sectional view on the line 3—3, Fig. 2, showing the full elevation of the receptacle depicted in Fig. 1 with the cover thereof in closed position; Fig. 4 is a fragmentary sectional view showing a modified form of the mouth rim and associated parts of an improved receptacle embodying this invention on a central line substantially at a right angle to that of the section of Fig. 3.

The body of the receptacle 1 may be either cylindrical, as shown in the accompanying drawings, or may be of any other desired shape, and may have a handle 2 and a pouring spout 3. Said body 1 has an open mouth 4 surrounded by a comparatively narrow rim 5 extending inwardly from the outer upper edge 6 of the body of the receptacle 1. An extension 7 of rim 5 covers spout 3 in the preferred form of this improved receptacle having a spout, as shown in Figs. 1 and 3. Rim 5 is preferably slightly inclined downwardly from the edge 6 as shown in Figs. 1 and 3, but may be otherwise constructed to serve the object hereinafter described, a modified form of construction being, for instance, such as shown in Fig. 4, wherein rim 5 is depicted as extending substantially at a right angle to the side of the body of the receptacle 1, and not inclined. A removable bottom 8 closes the lower end of the body of the receptacle 1, said bottom being removably held in place by any suitable means, such, for instance, as by means of pressed screw threads upon the body of the receptacle, coöperating with pressed screw threads upon the flange of the bottom 8, as best seen in Fig. 3.

A cover 9 is preferably fastened to the handle 2 by means of a hinge 10 having a thumb lever 11 for opening and closing the cover, said cover being adapted to cover the top of the receptacle 1 and may have an extension 12 (Figs. 1 and 3) adapted to cover the top of spout 3. Depending from the under side of said cover 9 are sharp pointed members 13 and 14 appropriately spaced apart, preferably two in number and of similar solid construction, of any desired shape and adapted to perforate the adjacent top 15 of a can 16 inserted into the body of receptacle 1 (as hereinafter described), when said cover 9 with its depending pointed members 13 and 14 is forced downward upon said top 15, as best seen in Fig. 3, to form two holes 17 and 18 (Fig. 1) in said top, hole 18 being adapted to discharge the contents of the can 16 therefrom when the receptacle is tilted and cover 9 opened, and hole 17 being adapted as an air inlet to admit air into can 16 to permit the discharge. Members 13 and 14 may be formed integrally with cover 9 or may be secured thereto in any suitable manner and by any suitable means, such, for instance, as the means shown in Fig. 1, consisting of a plate 19 borne by the under side of cover 9, said plate bearing two spaced collars 20 and 21 into which collars the bases of members 13 and 14, respectively, are set and secured by means of solder or any other suitable means. When holes 17 and 18 have been made as above described, the base portion or shanks of members 13 and 14 being adapted to fit snugly in said holes, respectively, close same when cover 9 is in closed position (Fig. 3), and open same when said cover is in open position (Fig. 1), that is members 13 and 14 serve the double purpose of perforating means and stoppers for the perforations formed by said perforating means.

Inwardly protruding ribs or ridges 22 may be formed on the body of the receptacle 1 to limit the lateral movement of can 16 inserted into the receptacle. Said ribs or ridges 22 may be formed in any suitable manner and may be pressed into the body of the receptacle 1 as shown in Figs. 1 and 2, or otherwise constructed to accomplish the purpose designated, and may, for instance, be separate members inserted into the inside of the body of the receptacle 1 and secured in place by any suitable means.

For more securely holding can 16 in place within the receptacle, there may be provided a flexible member 23, preferably a band, which is so disposed with reference to the body of the receptacle 1 that a greater portion of said member lies around the inside of said body adjacent to the inner wall thereof, there being appropriate slits 24 in said body to permit a portion of said band to pass from within the receptacle to the outside thereof, said outside portion of said band being provided with a device of any well known or suitable construction, such, for instance, as the thumb-screw 25 and associated parts illustrated in the accompanying drawings, adapted to take up the slack of band 23 and tighten same about can 16 inserted within the receptacle and said band to hold said can firmly in place.

In using the above described form of the improved receptacle of this invention, bottom 8 having been removed by unscrewing same from the body of the receptacle 1, can 16 is inserted into said body through the open bottom of said body, said can being pushed upward until the top thereof abuts against rim 5 at mouth 4 of the receptacle, leaving the bottom or lower end of said can to protrude slightly beyond the open bottom of said body of the receptacle 1, the receptacle being so constructed that rim 5 will limit the upward movement of can 16 sufficiently to permit said bottom or lower end of can 16 so to protrude, as best seen in Fig. 3. Bottom 8 is then screwed into place upon the body of receptacle 1 whereby said bottom 8 pressing against the adjacent bottom of can 16 as said bottom 8 is screwed into place will exert pressure against said bottom of can 16 and force the top 15 of said can firmly against the under side of rim 5 to form an intimate union of parts between said rim and the portions of the adjacent surface of said top.

In order to insure a more intimate union of parts between said rim 5 and adjacent portions of the surface of the top 15 of said can 16, rim 5, instead of being inclined as shown in Figs. 1 and 2, may extend substantially horizontally (when the receptacle is in upright position), as shown in Fig. 4, and a gasket 26 of any suitable material, such, for instance, as cork, rubber, leather, canvas, or the like, may be placed upon the top 15 of the can 16 under said rib 5, or said gasket may be attached to the underside of said rim, or any other suitable means of sealing the joint at said rim and said top 15 of can 16 may be employed. Furthermore, by manipulating the device 25 for taking up the slack of band 23 disposed about can 16, when same is inserted into the receptacle equipped herewith, band 23 is tightened about can 16 whereby said can is more firmly held in place in the receptacle against lateral motion. Can 16 having been inserted into the receptacle and secured therein as above described, perforations or holes 17 and 18 are made in the top 15 of said can by forcing the points of members 13 and 14 through said top and forcing cover 9 to closed position shown in Fig. 3. This may readily be accomplished by pressing down cover 9 toward said top 15 with the hand. The contents of can 16 may now be discharged by opening cover 9 which removes members 13 and 14 from holes 17 and 18 and, upon tilting the receptacle and the can therein forward in the direction of spout 3, the contents of can 16 may be poured out directly through hole 18 from whence it will flow over adjacent portions of the top of said can, rim 5, and spout 3, air for permitting the discharge of the can contents through said hole 18 being admitted into can 16 through hole 17. After a desired amount of the contents of can 16 has been discharged, the receptacle is restored to upright position and cover 9 is placed in closed position as shown in Fig. 3, whereby members 13 and 14 are caused to enter and close holes 17 and 18, respectively, thus preventing access of air to the remaining contents of said can through said holes and thus preventing said remaining contents from deteriorating.

The intimate union of parts hereinbefore described, between rim 5 and adjacent portions thereto of the top 15 of can 16 prevents portions of the contents of said can, when flowing over said can or associated parts in discharging same or otherwise, from flowing into interstices between said can and the receptacle of this invention, and any of the contents remaining on the top of said can or parts of the receptacle, such, for instance, as rim 5, may readily be wiped away and thus the receptacle and the can may be kept clean and sanitary. Any portion of the contents adhering to members 13 and 14 may be readily wiped away, and said members kept clean. Moreover, as in the receptacle of this invention, there are no comparatively long channels, no valves or other parts inaccessible or difficult of access for cleansing same where portions of the contents of a can may collect and grow stale, said receptacle has the great advantage of being very sanitary. When it is desired to remove can 16 from its receptacle because the contents of said can has been discharged, or for any other reason, this may readily and quickly be done by manipulating device 25 to loosen band 23 about said can, removing removable bottom 8 and pressing downward upon the top 15 of said can or grasping the slightly protruding portion of the bottom of said can at the open bottom of the body or receptacle 1 and withdrawing said can, whereupon a new can may be inserted into the receptacle ready for use, in place of the can removed, in the manner above described.

Many changes in the details of construction and arrangement of parts may be made without departing from the nature and spirit of the present invention.

I claim:

1. A holder for a can having an open top and bottom and a pouring spout at its upper end, a rim extending inwardly around said top to limit the upward movement of a can inserted in the receptacle and seal the joint between the can and the wall of the holder, means to hold the can in place in the holder, a cover hinged to the holder to swing into sealing contact with said rim, a thumb lever for said cover, and integrally formed perforating and sealing means for the cover connected to and carried by the cover.

2. A receptacle of the character described having an open top and bottom, a rim extending inwardly around said top, a hinged cover for said top, said cover having depending perforating means adapted to perforate a can inserted into said receptacle, said perforating means being adapted, also, to open and close the perforations as said cover is opened and closed, a flexible member adapted to hold said can in place within the receptacle, and means adapted adjustably to tighten and to loosen said flexible member about said can.

3. A receptacle of the character described having an open top and bottom, a rim extending inwardly around said top adapted to limit the upward movement of a can inserted into the receptacle, a hinged cover for said top, perforating means depending from said cover, said perforating means being adapted to perforate the top of said can and being, also, adapted automatically to open and close the perforations, a flexible member partially within said receptacle adapted to hold the can in place, means upon said member outside said receptacle adapted adjustably to tighten and to loosen said member about said can, and a removable closure for the bottom of said receptacle, said closure being adapted to exert upward pressure upon said can.

In testimony whereof I hereunto affix my signature in the presence of two witnesses.

BERTHOLD A. LANGE.

Witnesses:
 WALTER C. GUELS,
 NANCY C. THOMAS.